United States Patent
Hsu (10) Patent No.: US 11,947,103 B2
(45) Date of Patent: Apr. 2, 2024

(54) COLOR WHEEL MODULE AND PROJECTOR

(71) Applicant: Coretronic Corporation, Hsin-Chu (TW)

(72) Inventor: Pei-Yu Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/521,863

(22) Filed: Nov. 9, 2021

(65) Prior Publication Data

US 2022/0163876 A1 May 26, 2022

(30) Foreign Application Priority Data

Nov. 23, 2020 (CN) .......................... 202022721567.1

(51) Int. Cl.
*G03B 21/20* (2006.01)
*G02B 26/00* (2006.01)

(52) U.S. Cl.
CPC .......... *G02B 26/008* (2013.01); *G03B 21/204* (2013.01)

(58) Field of Classification Search
CPC ..... G03B 21/204; G03B 21/16; G02B 26/008
See application file for complete search history.

(56) References Cited

U.S. PATENT DOCUMENTS

| 6,604,830 | B1* | 8/2003 | Chiu | G02B 7/008 348/743 |
| 2014/0354960 | A1* | 12/2014 | Miyazaki | H04N 9/3111 359/723 |
| 2016/0363294 | A1* | 12/2016 | Yu | F21S 41/16 |
| 2019/0353994 | A1* | 11/2019 | Hsu | G03B 21/16 |
| 2020/0278599 | A1* | 9/2020 | Takasawa | F21V 7/22 |
| 2021/0096357 | A1* | 4/2021 | Li | G03B 21/16 |
| 2021/0286165 | A1* | 9/2021 | Asano | H04N 5/74 |
| 2021/0405345 | A1* | 12/2021 | Hsu | G02B 26/008 |
| 2022/0019137 | A1* | 1/2022 | Chen | G03B 21/204 |
| 2022/0091492 | A1* | 3/2022 | Kao | G03B 21/204 |

FOREIGN PATENT DOCUMENTS

| CN | 202546620 | | 11/2012 | |
| CN | 203549687 | | 4/2014 | |
| CN | 104216208 | | 4/2017 | |
| KR | 2007120831 | A * | 12/2007 | ............... G02B 5/20 |
| TW | 202006456 | | 2/2020 | |

* cited by examiner

*Primary Examiner* — Magda Cruz
(74) *Attorney, Agent, or Firm* — JCIPRNET (57) ABSTRACT

A color wheel module and a projector are provided. The projector includes the color wheel module, and the color wheel module includes a disk, an isolation framework, an assembly member, and a colloidal filler. The disk is configured to rotate around an axis. The isolation framework and the assembly member are disposed on the disk. The isolation framework is located between the disk and the assembly member. An air layer is formed between the disk, the assembly member and the isolation framework. The colloidal filler is disposed on the assembly member.

19 Claims, 11 Drawing Sheets

COLOR WHEEL MODULE AND PROJECTOR

CROSS-REFERENCE TO RELATED APPLICATION

This application claims the priority benefit of China application serial no. 202022721567.1, filed on Nov. 23, 2020. The entirety of the above-mentioned patent application is hereby incorporated by reference herein and made a part of this specification.

BACKGROUND

Technical Field

The disclosure relates to an optical module and a projector, and in particular to a color wheel module and a projector using the color wheel module.

Description of Related Art

In a solid-state lighting laser projection device, a phosphor wheel is located on a transmission path of an illumination beam of a light source module, and a blue laser light source is projected on a light conversion region of the phosphor wheel, so as to excite a yellow light source and achieve synthetization of white light. Since the laser is directly projected on a phosphor layer on a surface of a disk, the temperature of the disk rises, thereby increasing the temperature of the overall phosphor wheel. Furthermore, an adhesive layer between the disk and a weight ring cannot effectively block the heat. Therefore, a certain amount of heat will be conducted from the disk to the balance ring and a colloid on the balance ring that is configured for balance correction when the phosphor wheel is in operation. In general, most of the colloids used for dynamic balance correction of the phosphor wheel use UV-curable adhesives, which are characterized by being unable to withstand high temperatures for a long time. Therefore, when the heat is conducted from the disk to the balance ring, the colloid on the balance ring will be degraded by heat, which will cause the colloid to detach from the balance ring and affect the structural reliability of the phosphor wheel.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides a color wheel module, which has good structural reliability.

This disclosure provides a projector, including the color wheel module, which has good projection quality and product competitiveness.

Other objectives and advantages of the disclosure may be further understood from the technical features disclosed in the disclosure.

An embodiment of the disclosure provides a color wheel module, which includes a disk, an isolation framework, an assembly member, and a colloidal filler. The disk is configured to rotate around an axis. The isolation framework and the assembly member are disposed on the disk. The isolation framework is located between the disk and the assembly member. An air layer is formed between the disk, the assembly member and the isolation framework. The colloidal filler is disposed on the assembly member.

An embodiment of the disclosure provides a projector, which includes an illumination module, a light valve, and a projection lens. The illumination module includes a light source device, a lens and a color wheel module, and is configured to provide an illumination beam. The color wheel module is disposed on a transmission path of the illumination beam and is located between the light source device and the light valve. The lens is located between the light source device and the color wheel module. The color wheel module includes a disk, an isolation framework, an assembly member and a colloidal filler. The disk is configured to rotate around an axis. The isolation framework and the assembly member are disposed on the disk. The isolation framework is located between the disk and assembly member. An air layer is formed between the disk, the assembly member and the isolation framework. The colloidal filler is disposed on the assembly member. The light valve is disposed on the transmission path of the illumination beam to convert the illumination beam into an image beam. The projection lens is disposed on a transmission path of the image beam to convert the image beam into a projection beam.

Based on the above, the embodiments of the disclosure have at least one of the following characteristics. In the design of the color wheel module of the disclosure, the isolation framework is located between the disk and the assembly member, and the air layer is formed between the disk, the assembly member and the isolation framework. Hence, the air layer reduces thermal conductivity to effectively block or reduce the heat transfer from the disk to the colloidal filler on the assembly member, so as to prevent thermal degradation of the colloidal filler. Therefore, the color wheel module of the disclosure can have good structural reliability, and the projector using the color wheel module of the disclosure can have good projection quality and product competitiveness.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting.

On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting.

The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
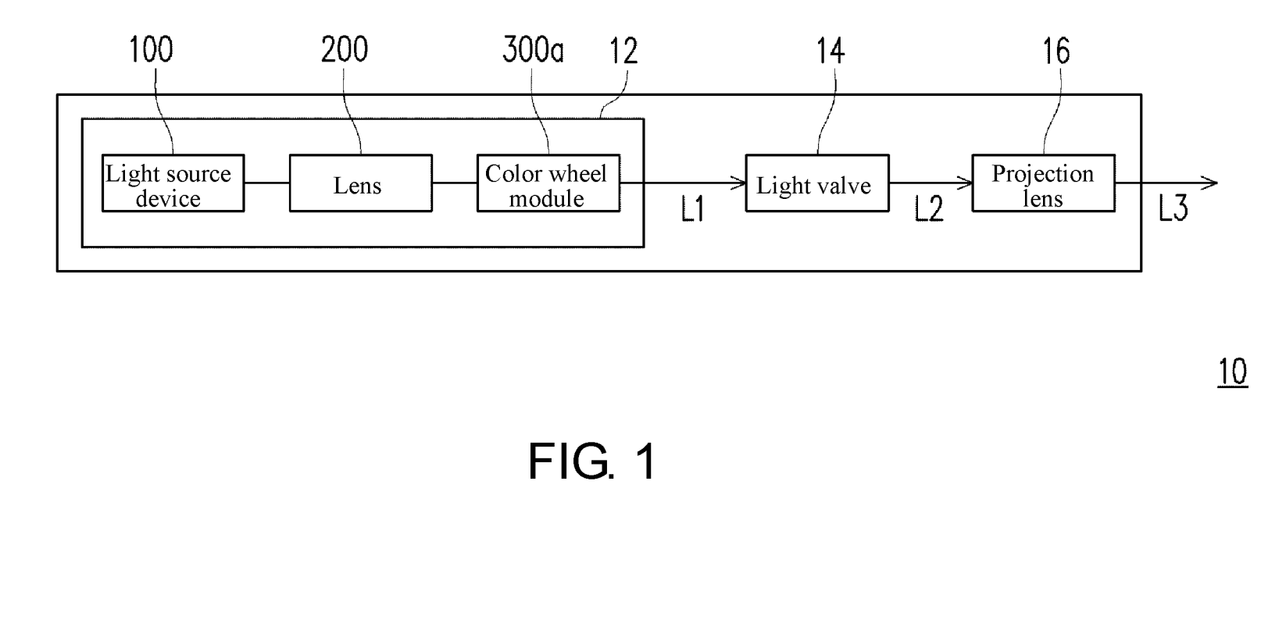
FIG. 1 is a schematic diagram of a projector according to an embodiment of the disclosure.

FIG. 1 is a schematic diagram of a projector according to an embodiment of the disclosure. With reference to FIG. 1, in the embodiment, a projector 10 includes an illumination module 12, a light valve 14 and a projection lens 16. The illumination module 12 includes a light source device 100, a lens 200, and a color wheel module 300a, and is configured to provide an illumination beam L1. The color wheel module 300a is disposed on a transmission path of the illumination beam L1 and is located between the light source device 100 and the light valve 14. The lens 200 is located between the light source device 100 and the color wheel module 300a. The light valve 14 is disposed on the transmission path of the illumination beam L1 to convert the illumination beam L1 into an image beam L2. The projection lens 16 is disposed on a transmission path of the image beam L2 to convert the image beam L2 into a projection beam L3.

Furthermore, the light source device 100 according to the embodiment is, for example, a laser diode (LD), such as a laser diode bank. Specifically, any light source that meets the size requirement of the actual design may be implemented, and the disclosure is not limited thereto. The light valve 14 is, for example, a reflective light modulator such as a liquid crystal on silicon (LCoS) panel and a digital micro-mirror device (DMD). In an embodiment, the light valve 14 is, for example, a transmissive optical modulator, such as a transparent liquid crystal panel, an electro-optical modulator, a magneto-optical modulator, and an acousto-optic modulator (AOM), but the embodiment does not limit the form and type of the light valve 14. The light valve 14 transforms the illumination beam L1 into the image beam L2. Sufficient teaching, suggestion and implementation description of the detailed steps and implementation manners of the transformation may be obtained from the common knowledge of the technical field, which will not be repeated here. In addition, the projection lens 16 includes, for example, a combination of one or more optical lenses with refractive power, such as various combinations of non-planar lenses such as a biconcave lens, a biconvex lens, a concave-convex lens, a convex-concave lens, a plano-convex lens, and a plano-concave lens. In an embodiment, the projection lens 16 may also include a flat optical lens to receive the image beam L2 coming from the light valve 14 through reflection or transmission, so as to generate the projection beam L3 and project it out of the projector 10. Here, the embodiment does not limit the form and type of the projection lens 16.

Figure 2A:
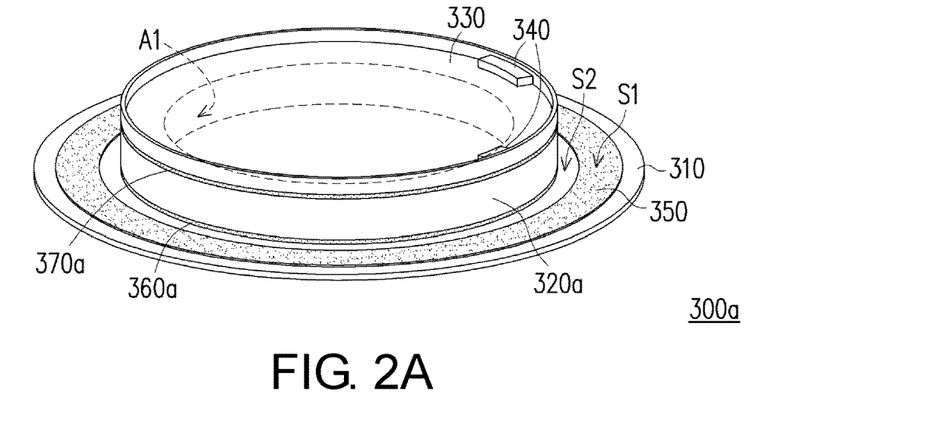
FIG. 2A is a three-dimensional schematic diagram of the color wheel module of the projector in FIG. 1.
Figure 2B:
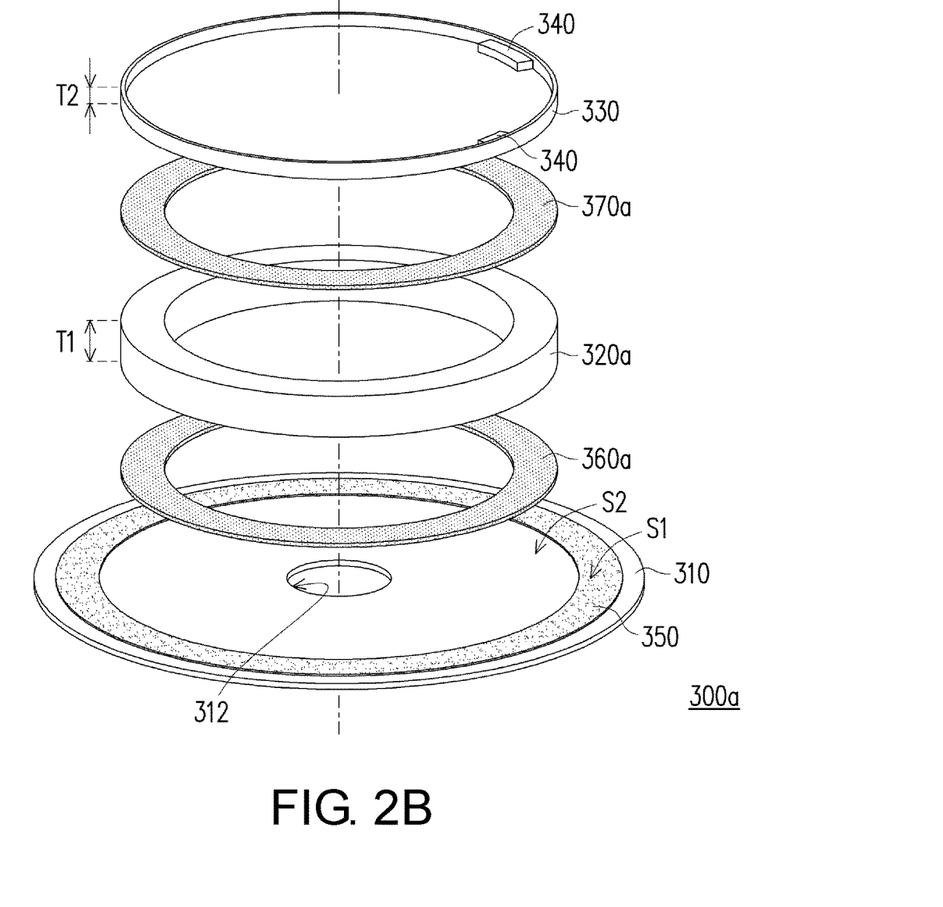
FIG. 2B is a three-dimensional exploded schematic diagram of the color wheel module in FIG. 2A.

FIG. 2A is a three-dimensional schematic diagram of the color wheel module of the projector in FIG. 1. FIG. 2B is a three-dimensional exploded schematic diagram of the color wheel module in FIG. 2A. With reference to FIG. 2A and FIG. 2B concurrently, in the embodiment, the color wheel module 300a includes a disk 310, an isolation framework 320a, an assembly member 330, and a colloidal filler 340.

The disk 310 is configured to rotate around an axis X. The isolation framework 320a and the assembly member 330 are disposed on the disk 310. The isolation framework 320a is located between the disk 310 and the assembly member 330, and an air layer A1 is formed between the disk 310, the assembly member 330 and the isolation framework 320a. The colloidal filler 340 is disposed on the assembly member 330. In the embodiment, the colloidal filler 340 is disposed on a side of the assembly member 330 away from the isolation framework 320a.

Since the air layer A1 is formed between the disk 310, the assembly member 330 and the isolation framework 320a, the air layer A1 may reduce thermal conductivity to effectively block or reduce heat transfer from the disk 310 of the color wheel module 300a to the assembly member 330 and the colloidal filler 340 disposed on the assembly member 330, so as to prevent thermal degradation of the colloidal filler 340, thereby increasing structural reliability of the color wheel module 300a. In other words, the existence of the air layer A1 may provide heat insulation between the disk 310 and the assembly member 330.

Furthermore, in the embodiment, the disk 310 has an optical wavelength conversion region S1 and a non-optical conversion region S2. The isolation framework 320a is disposed on the non-optical conversion region S2 of the disk 310. The color wheel module 300a further includes a wavelength conversion layer 350. The wavelength conversion layer 350 is disposed on the optical wavelength conversion region S1 of the disk 310. In other words, orthographic projections of the isolation framework 320a and the wavelength conversion layer 350 on the disk 310 do not overlap. Here, the wavelength conversion layer 350 is, for example, a phosphor layer. In an embodiment, a reflective layer (not shown) may also be disposed between the wavelength conversion layer 350 and the disk 310 to enhance reflectivity. Furthermore, the color wheel module 300a of the embodiment further includes a first adhesion layer 360a and a second adhesion layer 370a. The first adhesion layer 360a is disposed between the disk 310 and the isolation framework 320a. The isolation framework 320a is fixed on the non-optical conversion region S2 of the disk 310 through the first adhesion layer 360a. The second adhesion layer 30a is disposed between the isolation framework 320a and the assembly member 330. The assembly member 330 is fixed on the isolation framework 320a through the second adhesion layer 370a.

As shown in FIG. 2B, in the embodiment, a thickness T1 of the isolation framework 320a is greater than a thickness T2 of the assembly member 330. A material of the assembly member 330 includes, for example, metal, plastic, or ceramic. Preferably, thermal conductivity of the isolation framework 320a is lower than thermal conductivity of the assembly member 330, thereby reducing heat conduction from the disk 310 and accumulation on the assembly member 330. Heat may be dissipated quickly when the thermal conductivity of the assembly member 330 is higher than the thermal conductivity of the isolation framework 320a. Since more heat is accumulated on the isolation framework 320a, a heat-resistant temperature of the first adhesion layer 360a and a heat-resistant temperature of the second adhesion layer 370a are preferably respectively greater than a heat-resistant temperature of the colloidal filler 340. Here, the heat-resistant temperature refers to a maximum working temperature of the adhesion layer. In general, suppliers of the adhesion layers will provide the working temperature range of their products, and this range is usually measured by thermogravimetric analysis (TGA). The most common standard is to set the temperature range where a weight loss rate is less than 0.15% as the working temperature range. Preferably, materials used in the isolation framework 320a, the first adhesion layer 360a, and the second adhesion layer 370a are all non-thermal conductive or have low thermal conductivity.

With reference to FIG. 2B again, the shape of the isolation framework 320a of the embodiment is embodied as a hollow circle, and the shape of the assembly member 330 is embodied as a circular disk. In addition, exterior of the first adhesion layer 360a and exterior of the second adhesion layer 370a of the embodiment are respectively same as exterior of the isolation framework 320a. In other words, the exterior of the first adhesion layer 360a and the exterior of the second adhesion layer 370a are also hollow circles. In general, a driving member (not shown) passes through a lock hole 312 on the disk 310 and is locked to the assembly member 330. Therefore, the air layer A1 formed between the assembly member 330, the isolation framework 320a, and the disk 310 after components of the color wheel module 300a are assembled may be airtight.

In an embodiment, the isolation framework 320a of the embodiment uses, for example, a low thermal conductivity material. Thermal conductivity of the disk 310 is, for example, 237 W or more, and the thermal conductivity of the assembly member 330 is, for example, 237 W or more. Thermal conductivity of the two non-conductive first adhesion layer 360a and second adhesion layer 370a is, for example, less than 0.2 W. Thermal conductivity of the air layer A1 between the disk 310 and the assembly member 330 is, for example, equal to 0.024 W. Therefore, the thermal conductivity of the air layer A1 is much lower than the thermal conductivity of the assembly member 330 directly connected to the disk 310. Since the thermal conductivity of the air layer A1 is extremely low but it is also easier for the air layer A1 to store heat as compared to a metal, therefore a window for air exchange between the air layer A1 and external air is increased by the isolation framework 320a. This increases convection heat transfer and prevents heat from being accumulated between the assembly member 330 and the disk 310.

In short, in the embodiment, the air layer A1 is formed between the disk 310, the assembly member 330 and the isolation framework 320a, thereby reducing the thermal conductivity by the air layer A1, so as to effectively block or reduce the heat transfer from the disk 310 to the colloidal filler 340 on the assembly member 330 to prevent the thermal degradation of the colloidal filler 340. Therefore, the color wheel module 300a of the embodiment can have good structural reliability, and the projector 10 using the color wheel module 300a of the embodiment can have good projection quality and product competitiveness.

It should be noted here that the following embodiments continue to use reference numerals of elements and part of the content of the foregoing embodiments, in which the same numerals represent the same or similar elements, and description of the same technical content is omitted. Reference may be made to the foregoing embodiments for the description of the omitted part, which will not be repeated in the following embodiments.

Figure 3A:
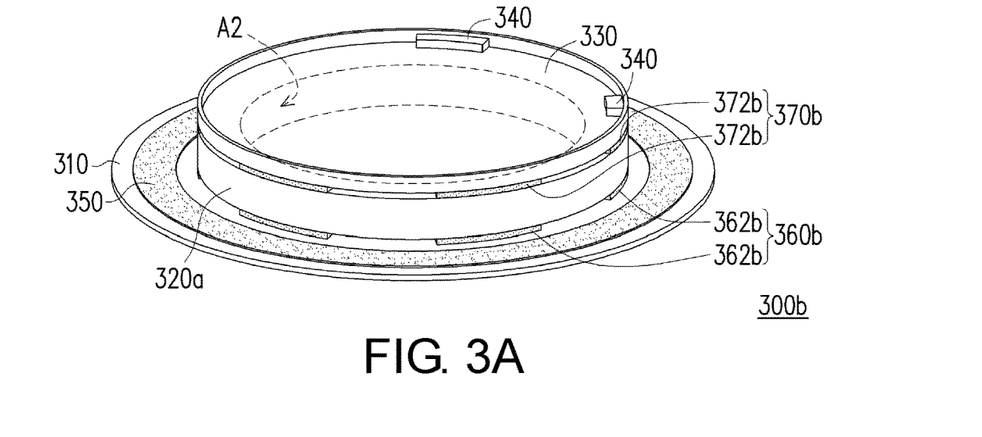
FIG. 3A is a three-dimensional schematic diagram of a color wheel module according to an embodiment of the disclosure.
Figure 3B:
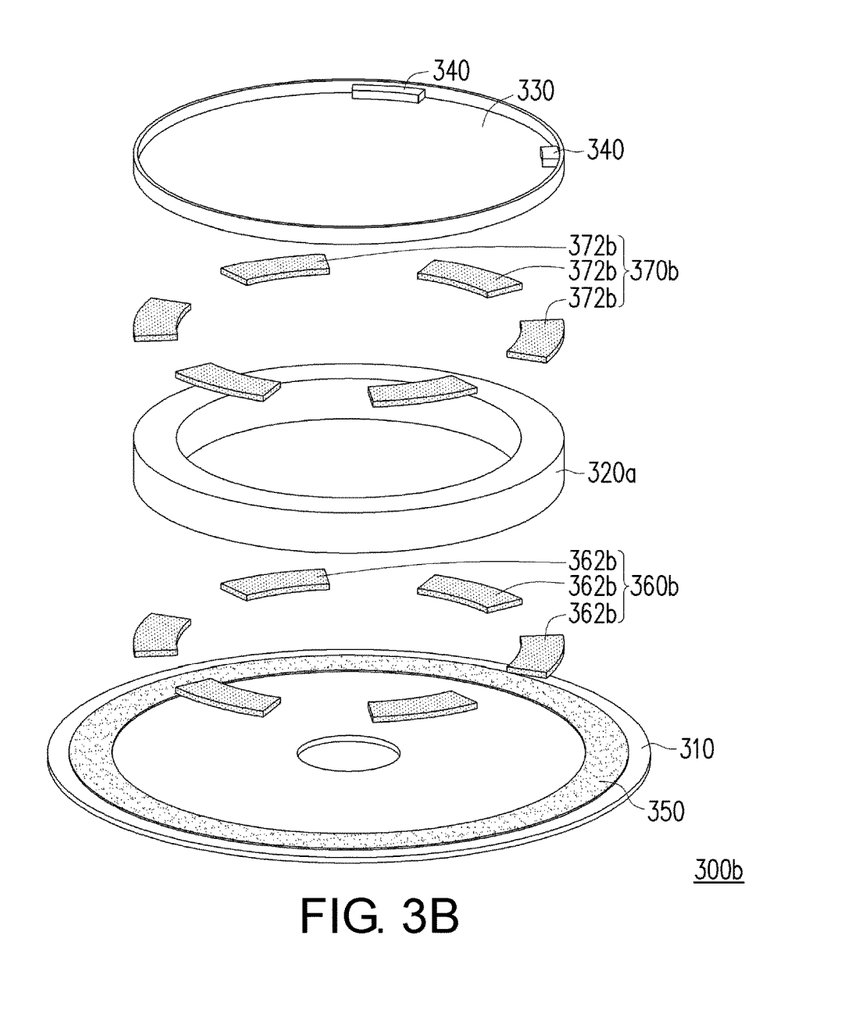
FIG. 3B is a three-dimensional exploded schematic diagram of the color wheel module in FIG. 3A.

FIG. 3A is a three-dimensional schematic diagram of a color wheel module according to an embodiment of the disclosure. FIG. 3B is a three-dimensional exploded schematic diagram of the color wheel module in FIG. 3A. With reference to FIGS. 2A, 2B, 3A, and 3B concurrently, a color wheel module 300b of the embodiment is similar to the color wheel module 300a in FIGS. 2A and 2B. A difference between the two is that in the embodiment, a first adhesion layer 360b of the color wheel module 300b has multiple first adhesion parts 362b that are separated from each other, and a second adhesion layer 370b has multiple second adhesion parts 372b that are separated from each other. The first adhesion parts 362b and the second adhesion parts 372b are respectively arranged along the exterior of the isolation framework 320a. That is to say, the first adhesion parts 362b and the second adhesion parts 372b are disposed in segments and present a discontinuous structure. Since there will be air gaps between the first adhesion parts 362b and the second adhesion parts 372b, an air layer A2 formed between the assembly member 330, the isolation framework 320a, and the disk 310 after components of the color wheel module 300b are assembled is not airtight. Since the air layer A2 is a non-airtight air layer, the air layer A2 may generate convection heat transfer with the external air when the color wheel module 300b is in operation, thereby increasing heat dissipation of the color wheel module 300b.

Figure 4A:
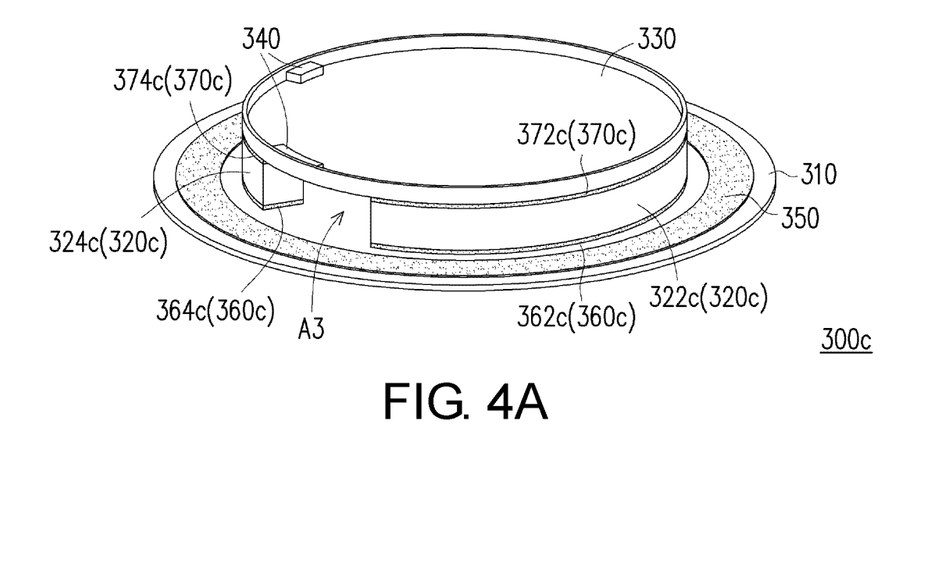
FIG. 4A is a three-dimensional schematic diagram of a color wheel module according to an embodiment of the disclosure.
Figure 4B:
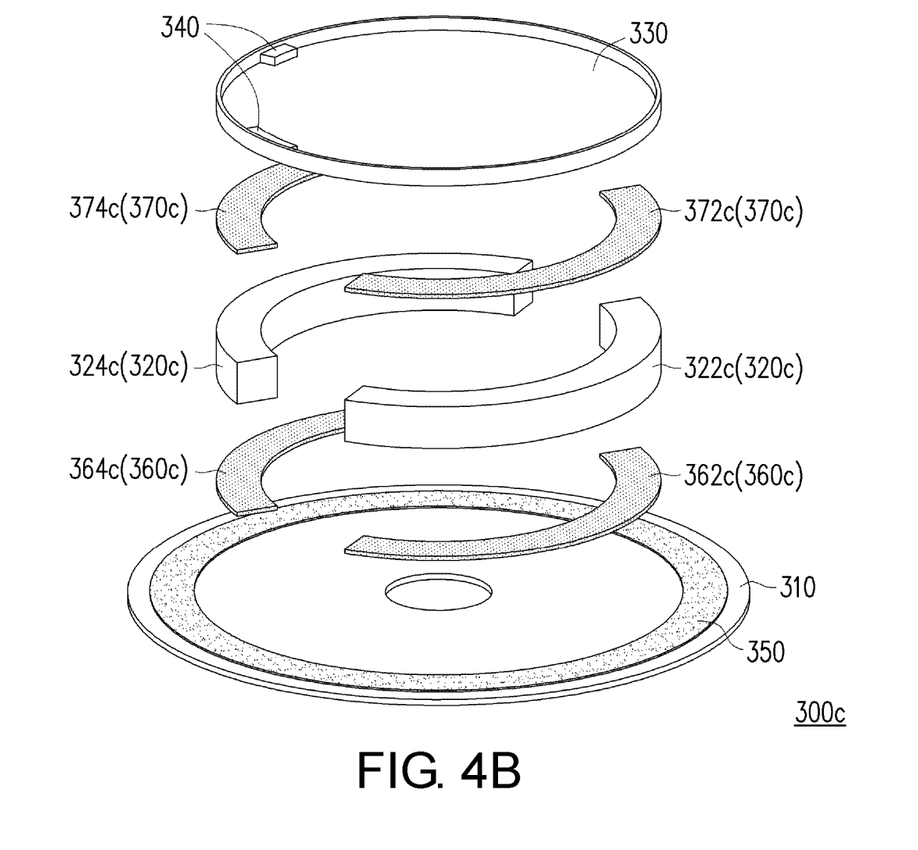
FIG. 4B is a three-dimensional exploded schematic diagram of the color wheel module in FIG. 4A.

FIG. 4A is a three-dimensional schematic diagram of a color wheel module according to an embodiment of the disclosure. FIG. 4B is a three-dimensional exploded schematic diagram of the color wheel module in FIG. 4A. With reference to FIGS. 2A, 2B, 4A, and 4B concurrently, a color wheel module 300c of the embodiment is similar to the color wheel module 300a in FIGS. 2A and 2B. A difference between the two is that in the embodiment, an isolation framework 320c of the color wheel module 300c includes a first isolation framework part 322c and a second isolation framework part 324c that are separated from each other. That is, the isolation framework 320c is disposed in segments instead of a complete ring, and there is a gap between the first isolation framework part 322c and the second isolation framework part 324c. That is, there is an interval between an end part of the first isolation framework part 322c and a corresponding end part of the second isolation framework part 324c. The shape of the first isolation framework part 322c and the shape of the second isolation framework part 324c are arcs opposite to each other, and the shape of the assembly member 330 is a circle. In addition, a first adhesion layer 360c of the embodiment has two first adhesion parts 362c and 364c that are separated from each other, and the second adhesion layer 370c has two second adhesion parts 372c and 374c that are separated from each other. The first adhesion part 362c and the second adhesion part 372c are respectively located on opposite sides of the first isolation framework part 322c, and the first adhesion part 364c and the second adhesion part 374c are respectively located on two opposite sides of the second isolation framework part 324c. Here, the shape of the first adhesion part 362c and the shape of the first adhesion part 364c are arcs opposite to each other, and the shape of the second adhesion part 372c and the shape of the second adhesion part 374c are arcs opposite to each other. Since there are air gaps between the first isolation framework part 322c and the second isolation framework part 324c, the first adhesion part 362c and the first adhesion part 364c, and the second adhesion part 372c and the second adhesion parts 374c, an air layer A3 formed between the assembly member 330, the isolation framework 320c and the disk 310 after components of the color wheel module 300c are assembled is not fully airtight. Since the air layer A3 is a non-airtight air layer, the air layer A3 may generate convection heat transfer with the external air when the color wheel module 300c is in operation, thereby increasing heat dissipation of the color wheel module 300c.

Figure 5A:
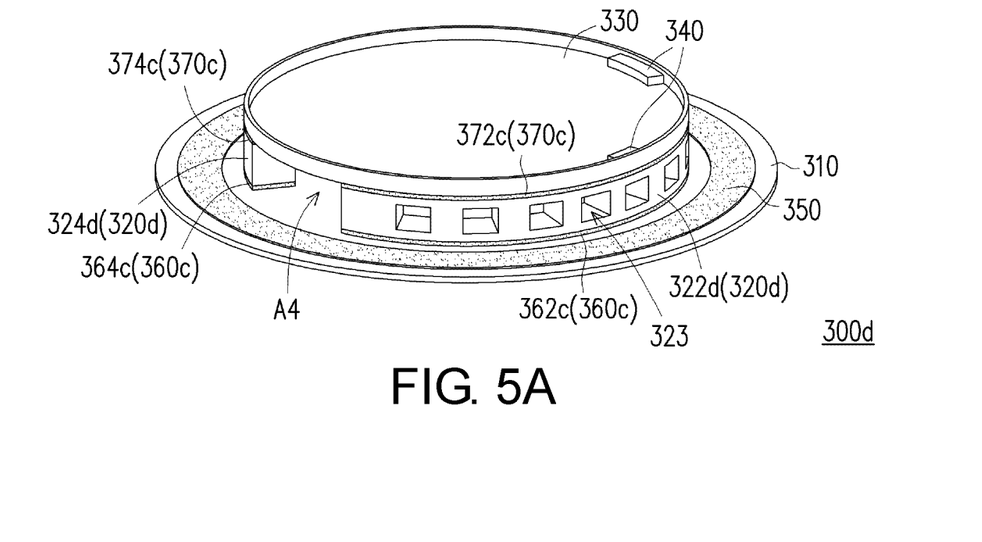
FIG. 5A is a three-dimensional schematic diagram of a color wheel module according to an embodiment of the disclosure.
Figure 5B:
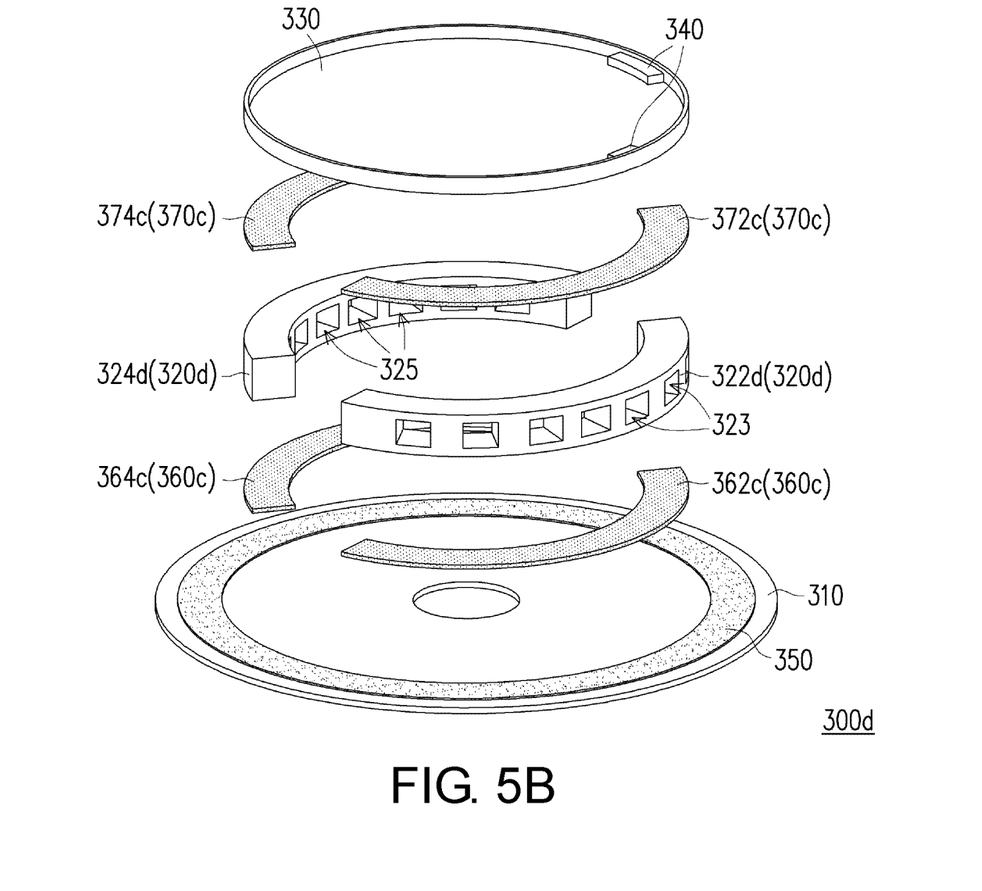
FIG. 5B is a three-dimensional exploded schematic diagram of the color wheel module in FIG. 5A.

FIG. 5A is a three-dimensional schematic diagram of a color wheel module according to an embodiment of the disclosure. FIG. 5B is a three-dimensional exploded schematic diagram of the color wheel module in FIG. 5A. With reference to FIGS. 4A, 4B, 5A, and 5B concurrently, a color wheel module 300d of the embodiment is similar to the color wheel module 300c in FIGS. 4A and 4B. Differences between the two are that in the embodiment, a first isolation framework part 322d of an isolation framework 320d has multiple first through holes 323 that are separated from each other and penetrating radially, a second isolation framework part 324d of the isolation framework 320d has multiple second through holes 325 that are separated from each other and penetrating radially, and there is an interval between an end part of the first isolation framework part 322d and a corresponding end part of the second isolation framework part 324d. An air layer A4 formed between the assembly member 330, the isolation framework 320d, and the disk 310 after components of the color wheel module 300d are assembled is not fully airtight. Disposition of the first through holes 323 and the second through holes 325 and an air gap between the two isolation framework parts 322d and 324d may increase heat exchange between the air layer A4 and the external air, and may strengthen convection heat transfer, thereby reducing accumulation of heat at the isolation framework 320d and may increase heat dissipation of the color wheel module 300d.

Figure 6A:
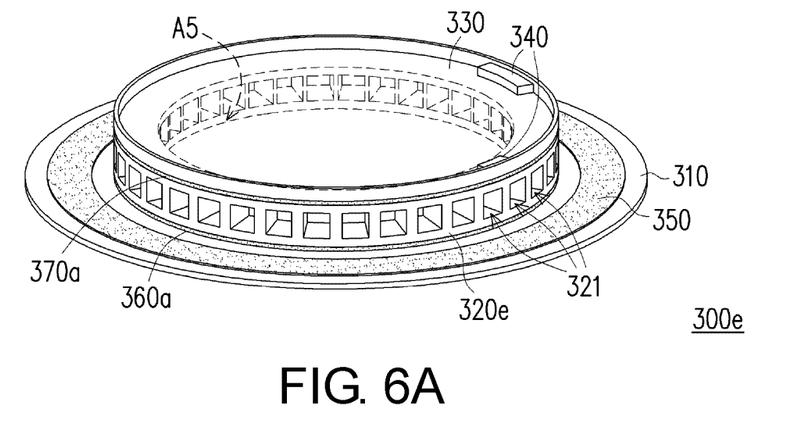
FIG. 6A is a three-dimensional schematic diagram of a color wheel module according to an embodiment of the disclosure.
Figure 6B:
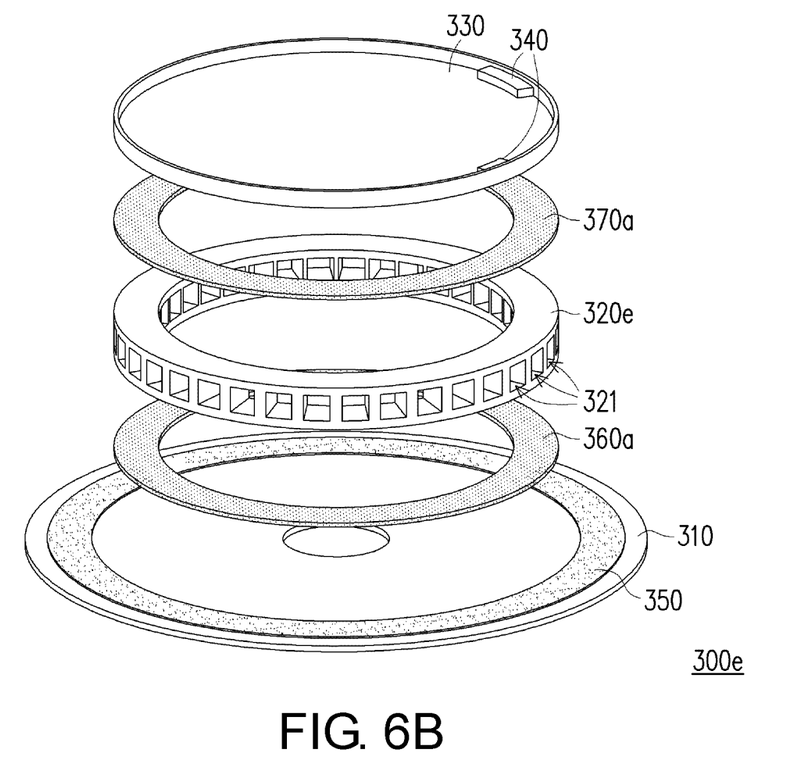
FIG. 6B is a three-dimensional exploded schematic diagram of the color wheel module in FIG. 6A.

FIG. 6A is a three-dimensional schematic diagram of a color wheel module according to an embodiment of the disclosure. FIG. 6B is a three-dimensional exploded schematic diagram of the color wheel module in FIG. 6A. With reference to FIGS. 2A, 2B, 6A, and 6B concurrently, a color wheel module 300e of the embodiment is similar to the color wheel module 300a in FIGS. 2A and 2B. A difference between the two is that in the embodiment, the shape of an isolation framework 320e is a hollow circle and it has multiple through holes 321 that are separated from each other and penetrating radially, the shape of the assembly member 330 is a circular disk, and the first adhesion layer 360a and the second adhesion layer 370a corresponding to the isolation framework 320e are annular (hollow circle). An air layer A5 formed between the assembly member 330, the isolation framework 320e and the disk 310 after components of the color wheel module 300e are assembled is not fully airtight. Disposition of the through holes 321 may increase heat exchange between the air layer A5 and the external air, and may strengthen convection heat transfer, thereby reducing accumulation of heat at the isolation framework 320e and may increase heat dissipation of the color wheel module 300e.

Figure 7A:
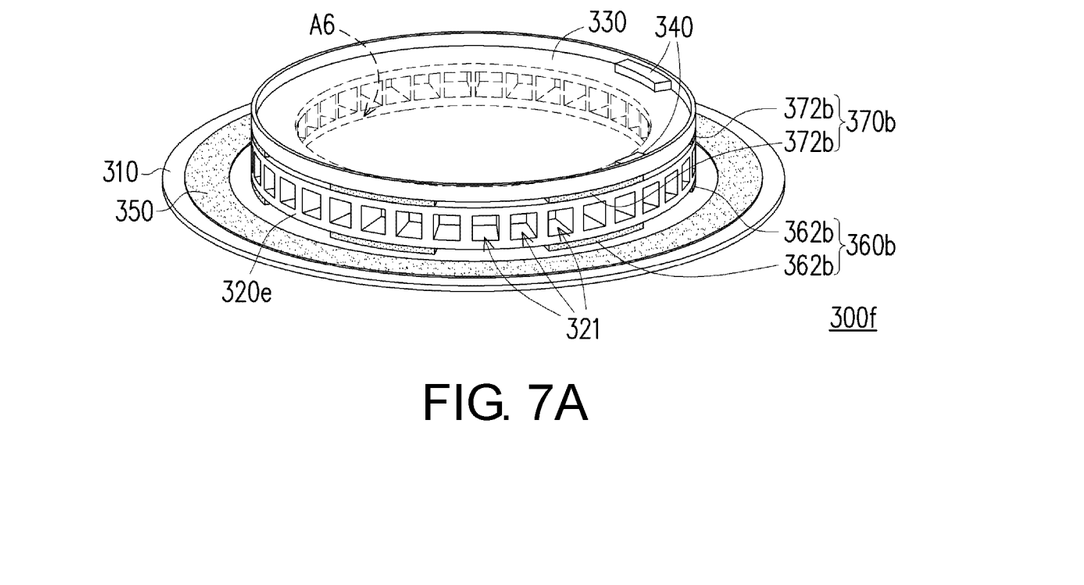
FIG. 7A is a three-dimensional schematic diagram of a color wheel module according to an embodiment of the disclosure.
Figure 7B:
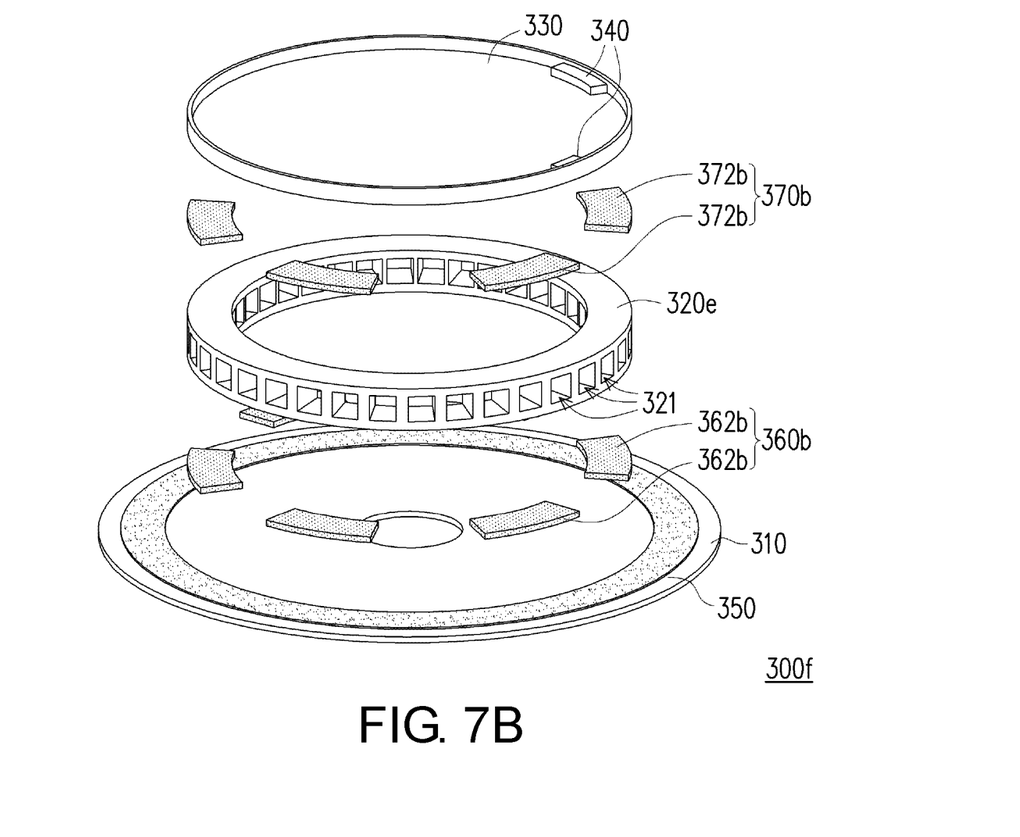
FIG. 7B is a three-dimensional exploded schematic diagram of the color wheel module in FIG. 7A.

FIG. 7A is a three-dimensional schematic diagram of a color wheel module according to an embodiment of the disclosure. FIG. 7B is a three-dimensional exploded schematic diagram of the color wheel module in FIG. 7A. With reference to FIGS. 6A, 6B, 7A, and 7B concurrently, a color wheel module 300f of the embodiment is similar to the color wheel module 300e in FIGS. 6A and 6B. A difference between the two is that in the embodiment, the first adhesion layer 360b of the color wheel module 300f has the multiple first adhesion parts 362b that are separated from each other, and the second adhesion layer 370b has the multiple second adhesion parts 372b that are separated from each other. The first adhesion parts 362b and the second adhesion parts 372b are respectively arranged along the exterior of the isolation framework 320a. An air layer A6 formed between the assembly member 330, the isolation framework 320e and the disk 310 after components of the color wheel module 300*f* are assembled is not fully airtight. Since the air layer A6 is a non-airtight air layer, the air layer A6 may generate convection heat transfer with the external air when the color wheel module 300*f* is in operation, thereby increasing heat dissipation of the color wheel module 300*f*.

Figure 8A:
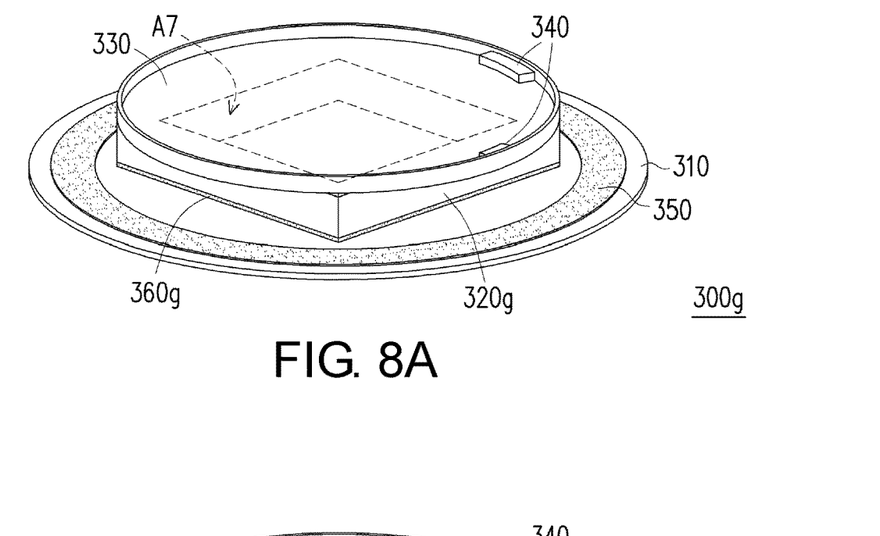
FIG. 8A is a three-dimensional schematic diagram of a color wheel module according to an embodiment of the disclosure.
Figure 8B:
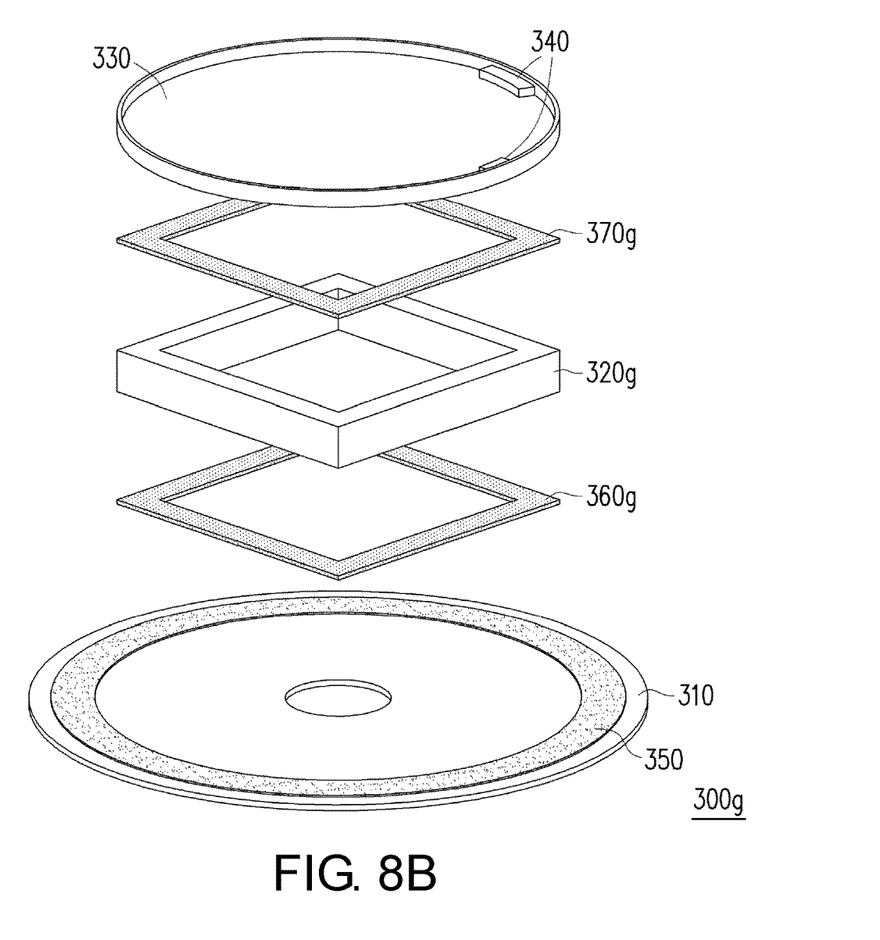
FIG. 8B is a three-dimensional exploded schematic diagram of the color wheel module in FIG. 8A.

FIG. 8A is a three-dimensional schematic diagram of a color wheel module according to an embodiment of the disclosure. FIG. 8B is a three-dimensional exploded schematic diagram of the color wheel module in FIG. 8A. With reference to FIGS. 2A, 2B, 8A, and 8B concurrently, a color wheel module 300*g* of the embodiment is similar to the color wheel module 300*a* in FIGS. 2A and 2B. A difference between the two is that in the embodiment, the shape of an isolation framework 320*g* is, for example, a hollow polygon, such as a rectangle, and the shape of assembly member 330 is a circular disk. In another embodiment that is not shown, the shape of the isolation framework 320*g* may also be a polygonal or a square, but it is not limited thereto. Preferably, the area of orthographic projection of the assembly member 330 on the disk 310 is slightly smaller or larger than the area of orthographic projection of the isolation framework 320*g* on the disk 310. The shape of a first adhesion layer 360*g* and the shape of a second adhesion layer 370*g* are same as the shape of the isolation framework 320*g*, for example, a hollow polygon, such as a rectangle, but are not limited thereto. An air layer A7 formed between the assembly member 330, the isolation framework 320*g*, and the disk 310 after components of the color wheel module 300*g* are assembled is airtight.

Figure 9A:
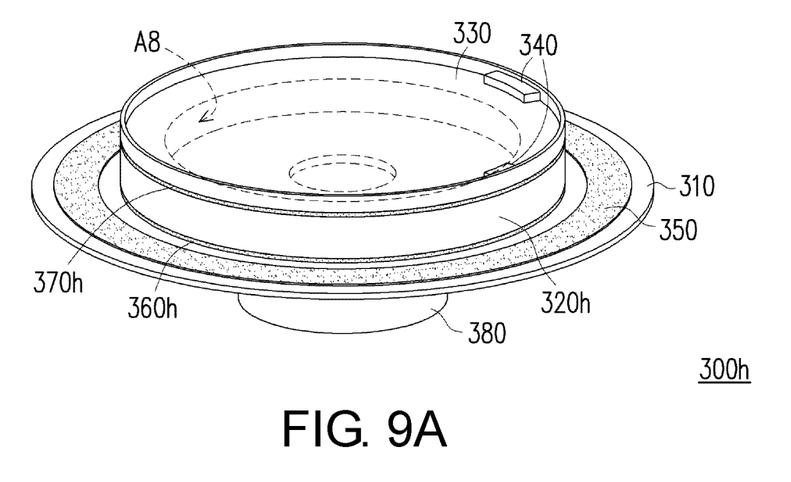
FIG. 9A is a three-dimensional schematic diagram of a color wheel module according to an embodiment of the disclosure.
Figure 9B:
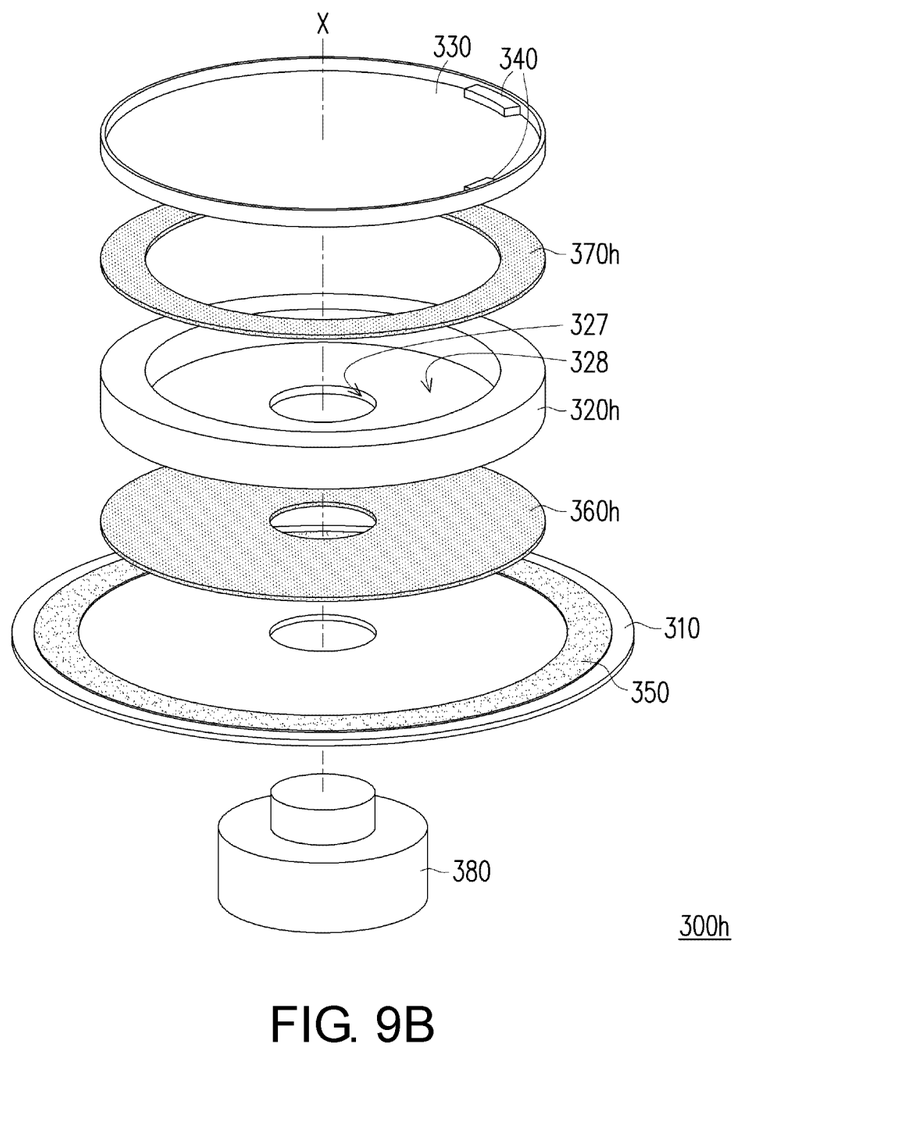
FIG. 9B is a three-dimensional exploded schematic diagram of the color wheel module in FIG. 9A.

FIG. 9A is a three-dimensional schematic diagram of a color wheel module according to an embodiment of the disclosure. FIG. 9B is a three-dimensional exploded schematic diagram of the color wheel module in FIG. 9A. With reference to FIGS. 2A, 2B, 9A, and 9B concurrently, a color wheel module 300*h* of the embodiment is similar to the color wheel module 300*a* in FIGS. 2A and 2B. A difference between the two is that in the embodiment, an isolation framework 320*h* is embodied as an isolation disk body with a lock hole 327. The lock hole 327 is a through hole penetrating in a direction of the axis X. A bottom 328 of the isolation disk body 320*h* is connected to the disk 310. An edge of the isolation disk body 320*h* protrudes in the direction of the axis X and is connected to the assembly member 330, and the shape of the assembly member 330 is a circle. Here, exterior of the first adhesion layer 360*h* is different from exterior of the second adhesion layer 370*h*, but is not limited thereto. In addition, the color wheel module 300*h* of the embodiment further includes a driving member 380. A rotational shaft (not numbered) of the driving member 380 is connected to the lock hole 327 of the isolation disk body 320*h* in the direction of the axis X, which may prevent the driving member 380 from being locked to the assembly member 330 and may reduce heat generated by the driving member 380 being conducted to the assembly member 330. An air layer A8 formed between the disk 310, the assembly member 330 and the isolation disk body 320*h* after components of the color wheel module 300*h* are assembled is airtight.

Figure 10A:
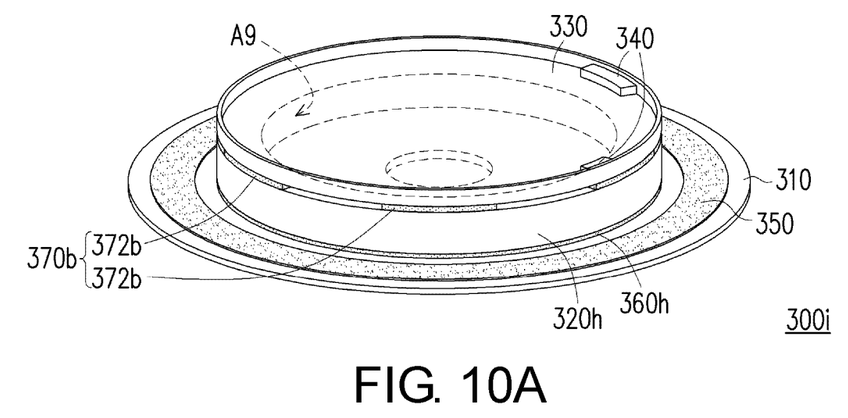
FIG. 10A is a three-dimensional schematic diagram of a color wheel module according to an embodiment of the disclosure.
Figure 10B:
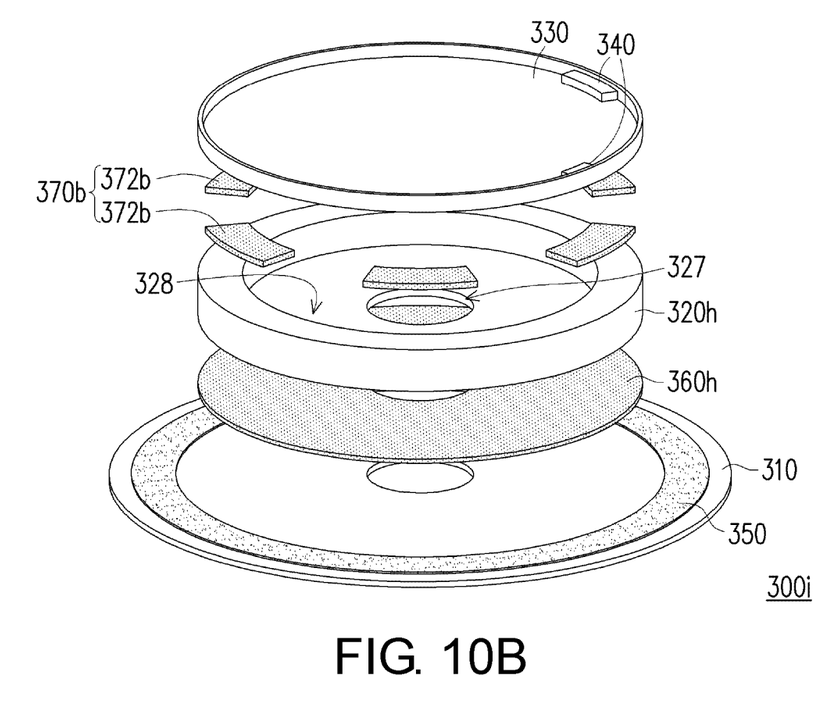
FIG. 10B is a three-dimensional exploded schematic diagram of the color wheel module in FIG. 10A.

FIG. 10A is a three-dimensional schematic diagram of a color wheel module according to an embodiment of the disclosure. FIG. 10B is a three-dimensional exploded schematic diagram of the color wheel module in FIG. 10A. It should be noted that, for convenience of description, the driving member is omitted in FIGS. 10A and 10B. With reference to FIGS. 9A, 9B, 10A, and 10B concurrently, a color wheel module 300*i* of the embodiment is similar to the color wheel module 300*h* in FIGS. 9A and 9B. A difference between the two is that in the embodiment, the second adhesion layer 370*b* has the multiple second adhesion parts 372*b* that are separated from each other. The second adhesion parts 372*b* are respectively arranged along the exterior of the isolation disk body 320*h*. An air layer A9 formed between the disk 310, the assembly member 330 and the isolation disk body 320*h* after components of the color wheel module 300*i* are assembled is not fully airtight. Since the air layer A9 is a non-airtight air layer, the air layer A9 may generate convection heat transfer with the external air when the color wheel module 300*i* is in operation, thereby increasing heat dissipation of the color wheel module 300*i*.

In summary, the embodiments of the disclosure have at least one of the following characteristics. In the design of the color wheel module of the disclosure, the isolation framework is located between the disk and the assembly member. An air layer is formed between the disk, the assembly member and the isolation framework. The air layer reduces the thermal conductivity to effectively block or reduce the heat transfer from the disk to the colloidal filler on the assembly member, so as to avoid the thermal degradation of the colloidal filler. Therefore, the color wheel module of the disclosure can have good structural reliability, and the projector using the color wheel module of the disclosure can have good projection quality and product competitiveness.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementations. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A color wheel module, comprising a disk, an isolation framework, an assembly member, a wavelength conversion layer, and a colloidal filler, wherein
the disk is configured to rotate around an axis,
the isolation framework and the assembly member are disposed on the disk,
the isolation framework is located between the disk and the assembly member, wherein an air layer is formed between the disk, the assembly member and the isolation framework, and
the colloidal filler is disposed on the assembly member;
wherein the disk has an optical wavelength conversion region, the wavelength conversion layer is disposed on the optical wavelength conversion region, and an orthographic projection of the isolation framework and an orthographic projection of the wavelength conversion layer on the disk do not overlap with each other.

2. The color wheel module according to claim 1, wherein the disk further has a non-optical conversion region, and the isolation framework is disposed in the non-optical conversion region.

3. The color wheel module according to claim 1, wherein a shape of the isolation framework is a hollow circle, a shape of the assembly member is a circle, and the air layer formed between the assembly member, the isolation framework, and the disk is airtight.

4. The color wheel module according to claim 1, wherein a shape of the isolation framework is a hollow circle and the isolation framework has a plurality of through holes that are separated from each other and penetrating radially, a shape of the assembly member is a circle, and the air layer formed between the assembly member, the isolation framework and the disk is not airtight.

5. The color wheel module according to claim 1, wherein the isolation framework comprises a first isolation framework part and a second isolation framework part that are separated from each other, a shape of the first isolation framework part and a shape of the second isolation framework part are arcs opposite to each other, a shape of the assembly member is a circle, and the air layer formed between the assembly member, the isolation framework and the disk is not airtight.

6. The color wheel module according to claim 5, wherein the first isolation framework part has a plurality of first through holes that are separated from each other and penetrating radially, and the second isolation framework part has a plurality of second through holes that are separated from each other and penetrating radially.

7. The color wheel module according to claim 1, wherein a shape of the isolation framework is a hollow polygon, a shape of the assembly member is a circle, and the air layer formed between the assembly member, the isolation framework, and the disk is airtight.

8. The color wheel module according to claim 7, wherein an area of orthographic projection of the assembly member on the disk is slightly smaller or larger than an area of orthographic projection of the isolation framework on the disk.

9. The color wheel module according to claim 1, wherein the isolation framework is an isolation disk body with a lock hole, a bottom of the isolation disk body is connected to the disk, an edge of the isolation disk body protrudes in a direction of the axis and is connected to the assembly member, and a shape of the assembly member is a circle.

10. The color wheel module according to claim 9, wherein the color wheel module further comprises:
a driving member, wherein a rotational shaft of the driving member is connected to the lock hole of the isolation disk body, and the air layer formed between the assembly member and the isolation disk body is airtight.

11. The color wheel module according to claim 1, wherein a thickness of the isolation framework is greater than a thickness of the assembly member.

12. The color wheel module according to claim 1, further comprising a first adhesion layer and a second adhesion layer, wherein
the first adhesion layer is disposed between the disk and the isolation framework, wherein the isolation framework is fixed on the disk through the first adhesion layer, and
the second adhesion layer is disposed between the isolation framework and the assembly member, wherein the assembly member is fixed on the isolation framework through the second adhesion layer.

13. The color wheel module according to claim 12, wherein exterior of the first adhesion layer and exterior of the second adhesion layer are respectively same as exterior of the isolation framework.

14. The color wheel module according to claim 12, wherein the first adhesion layer has a plurality of first adhesion parts that are separated from each other, the second adhesion layer has a plurality of second adhesion parts that are separated from each other, and the plurality of first adhesion parts and the plurality of second adhesion parts are respectively arranged along exterior of the isolation framework.

15. The color wheel module according to claim 12, wherein exterior of the first adhesion layer is different from exterior of the second adhesion layer.

16. The color wheel module according to claim 12, wherein a heat-resistant temperature of the first adhesion layer and a heat-resistant temperature of the second adhesion layer are respectively greater than a heat-resistant temperature of the colloidal filler.

17. The color wheel module according to claim 1, wherein a thermal conductivity of the isolation framework is less than a thermal conductivity of the assembly member.

18. The color wheel module according to claim 1, wherein a material of the assembly member comprises metal, plastic or ceramic.

19. A projector, comprising an illumination module, a light valve and a projection lens, wherein
the illumination module comprises a light source device, a lens, and a color wheel module, and is configured to provide an illumination beam, wherein the color wheel module is disposed on a transmission path of the illumination beam and is located between the light source device and the light valve, the lens is located between the light source device and the color wheel module, and the color wheel module comprises a disk, an isolation framework, an assembly member, a wavelength conversion layer, and
a colloidal filler, wherein
the disk is configured to rotate around an axis,
the isolation framework and the assembly member are disposed on the disk,
the isolation framework is located between the disk and the assembly member, wherein an air layer is formed between the disk, the assembly member and the isolation framework, and
the colloidal filler is disposed on the assembly member, wherein the disk has an optical wavelength conversion region, the wavelength conversion layer is disposed on the optical wavelength conversion region, and an orthographic projection of the isolation framework and an orthographic projection of the wavelength conversion layer on the disk do not overlap with each other, the light valve is disposed on the transmission path of the illumination beam to convert the illumination beam into an image beam, and the projection lens is disposed on a transmission path of the image beam to convert the image beam into a projection beam.

\* \* \* \* \*